United States Patent [19]

Smith

[11] Patent Number: 5,614,709

[45] Date of Patent: Mar. 25, 1997

[54] METHOD FOR ACCURATELY COUNTING CONVEYED WORKPIECES REGARDLESS OF VARIATIONS IN CONVEYOR SPEED

[75] Inventor: Wayne T. Smith, San Rafael, Calif.

[73] Assignee: Golden Gate Microsystems, Inc., San Rafael, Calif.

[21] Appl. No.: 431,453

[22] Filed: May 1, 1995

[51] Int. Cl.$^6$ .................................................. G01V 9/04
[52] U.S. Cl. .................................. 250/223 R; 250/559.4; 250/559.47; 377/8; 377/53
[58] Field of Search .......................... 250/559.47, 559.4, 250/559.42, 559.43, 223 R; 377/6, 8, 53, 49

[56] References Cited

U.S. PATENT DOCUMENTS

| | | |
|---|---|---|
| 3,842,965 | 10/1974 | Pfaffle . |
| 4,072,854 | 2/1978 | Oshima et al. . |
| 4,197,935 | 4/1980 | Aterianus et al. . |
| 4,237,378 | 12/1980 | Jones .................................. 250/223 R |
| 4,384,195 | 5/1983 | Nosler . |
| 4,450,352 | 5/1984 | Olsson . |
| 4,504,961 | 3/1985 | Horiguchi . |
| 4,532,421 | 7/1985 | Sasaoka et al. ..................... 250/223 R |
| 4,545,031 | 10/1985 | Kobayashi . |
| 4,560,159 | 12/1985 | Staub . |
| 4,732,261 | 3/1988 | Mattern et al. . |
| 4,803,373 | 2/1989 | Imamura et al. .................. 250/559.47 |
| 4,807,263 | 2/1989 | Ohno et al. . |
| 4,922,110 | 5/1990 | Melcher ................................. 250/556 |
| 4,995,858 | 2/1991 | Stäb . |
| 4,998,614 | 3/1991 | Riemenschneider et al. . |
| 5,022,644 | 6/1991 | Bürge . |
| 5,038,915 | 8/1991 | Delsanto . |
| 5,220,178 | 6/1993 | Dreiling et al. ........................ 250/572 |
| 5,263,705 | 11/1993 | Schmaling . |

*Primary Examiner*—Stephone Allen
*Attorney, Agent, or Firm*—Thomas M. Freiburger

[57] ABSTRACT

A method for counting conveyed workpieces, such as on a variable speed conveyor belt, includes sensing interruptions via an object sensor such as an optical sensor with a light beam, and with a computer, applying a mathematical comparison between duration of interruptions to the light beam path and gaps that separate these interruptions. The comparison determines which interruptions are caused by the passage of conveyed workpieces and which interruptions are caused by the passage of other objects such as components of the conveyor belt. The method described involves the selection of a preset factor used in a ratio comparison between the duration of interruptions to the light beam and the gaps that separate these interruptions such that the computer is able to accurately count objects such as sheets of paper pulled by gripper bars and distinguishing between sheets of paper and gripper bars such that gripper bars and clips are not incorrectly counted as sheets of paper. Accuracy is not compromised by changes in speed of the conveyor. The gripper bars are fully filtered from the product count value.

14 Claims, 4 Drawing Sheets

METHOD FOR ACCURATELY COUNTING CONVEYED WORKPIECES REGARDLESS OF VARIATIONS IN CONVEYOR SPEED

BACKGROUND OF THE INVENTION

This invention is concerned with accurately counting the passage of workpieces on a conveyor system or production line path, and more particularly, it relates to an improved method of sensing interruptions in the path of a light beam or other sensor at a preset point along a conveyor and, with a computer, applying a mathematical relationship to the measured durations of these interruptions and the time periods separating them, to determine which interruptions should be counted as representing the passage of conveyed workpieces and avoiding accidental counting of other interruptions.

In the printing industry, problems occur when attempting to optically count the high speed passage of single sheets of paper along a conveyor, especially where the conveyor speed is variable, gaps occur between sheets and sheets may be missing at various locations along the conveyor. Although other types of sensors can be used, typically an optical sensor has been used to detect breaks in the path of a beam of light, the breaks being caused by the passage of intervening sheets of paper.

On a printing press or other paper handling production line, sheets of paper moving along a conveyor are typically pulled by gripper clips attached to a gripper bar. These gripper bar and clip devices precede each sheet of paper along the path of the conveyor. Consequently, when sheets of paper are sequentially pulled through the path of a light beam, the gripper bar and possibly the clip device will also cause an interruption to the path of the light beam. A common practice in the industry has been to simply count up the number of light beam interruptions and divide this figure by two, calling this the sheet count. This method is based on the assumption that for each light beam interruption caused by a sheet of paper, another interruption will be caused by the passage of the attached gripper bar. This assumption is faulty for several reasons. First, when a sheet is missing at a particular location on the conveyor, its gripper bar and clip still cause a light beam interruption, thus causing errors in the count. Secondly, a particular positional alignment of the gripper clip may periodically cause a long duration interruption to the light beam as the gripper bar and clip and sheet of paper all pass through the path of the light beam together, causing only one interruption and again introducing an error. This single long interruption is caused first by the gripper bar, then by the gripper clip, then by the sheet of paper, with no separation between these interruptions.

Another practice in the industry has been to measure the time durations of light beam interruptions and then to try to discern whether each interruption is caused by the passage of a sheet of paper. The major limitation to this time measurement method is its inability to account for changes in conveyor speed.

It is an object of this invention to overcome the above problems and to accurately count sheets of paper passing along a variable speed conveyor such that these sheets of paper can be reliably distinguished from gripper bars and clips; a broader object is to accurately count conveyed workpieces in general, where conveyor components could be confused with workpieces.

SUMMARY OF THE INVENTION

In accordance with a preferred embodiment of the present invention, a method for accurately counting sheets of paper pulled along a conveyor by gripper clips connected to gripper bars uses an optical light source and light receiver between which passes a beam of light which is interrupted by the passage of sheets of paper and gripper bars (and occasionally gripper clips) moving along the conveyor. Other forms of product sensors can be used, such as ultrasonic, capacitative or piezoelectric sensors.

The gripper bars are separated a short distance from the sheets of paper by the intervening gripper clips. Typically, when the conveyor is moving, the gripper bar will first briefly cause an interruption to the light beam, which is then followed by a longer interruption caused by the passage of the sheet of paper. Due to the physical separation of the gripper bar from the sheet of paper, the following typical pattern of light beam interruption results. First, the gripper bar interrupts the beam and then the path of the beam is resumed during the physical gap between the gripper bar and the sheet of paper. Next, the beam is again interrupted, this time by the leading edge of the sheet of paper and then the path of the beam is again restored after the passage of the trailing end of the sheet. The cycle then repeats itself when another gripper bar interrupts the light beam path. As such, a repeating pattern of short and long interruptions to the light beam is typically generated. However, three other scenarios may also exist which must be considered.

In one additional (second) scenario, if a sheet of paper is missing at a particular empty gripper bar location along the conveyor, the longer interruption period (which would have been caused by a sheet of paper) will not occur. Rather, a long uninterrupted period of beam passage will occur between the two brief interruptions caused by the passage of the two consecutive gripper bars.

In a third scenario, if the gripper clip happens to be positioned on the gripper bar such that it also interrupts the path of the light beam, and a sheet of paper is missing at that particular gripper bar location, the passage of the gripper bar and clip will cause an interruption to the light beam that will be longer than the interruption caused by a gripper bar alone. This interruption will next be followed by a long uninterrupted beam passage period until the following gripper bar interrupts the light beam. This long interrupted beam passage period is slightly shorter than in the case of an empty gripper bar with its clips positioned such that they do not interrupt the path of the light beam, causing the path of the light beam to be resumed earlier.

In a fourth scenario, if the gripper clip happens to be positioned such that it interrupts the light beam path, and a sheet of paper is present at that particular gripper bar location, the passage of the gripper bar, gripper clip and sheet of paper will create a single long and continuous interruption to the passage of the light beam, as discussed above.

As noted, the gripper clips may be positioned so as to interfere with the path of the light beam. The third and fourth scenarios discussed above may occur frequently along the conveyor.

The main object of the present invention is to provide a method of accurately counting sheets of paper moving along a conveyor by reliably analyzing the interruptions to the light beam and discerning whether such interruptions have been caused by the passage of a sheet of paper or some other object (i.e. the gripper bar or the gripper bar and clip).

A computer is used to perform a mathematical comparison between the time duration of a light beam interruption and its immediately preceding period of uninterrupted light beam passage. The comparison between these time periods is made such that it is accurate for any speed of conveyor movement and is applied in a way such that it also yields accurate results during changes in conveyor speeds. Stated more generally, the mathematical comparison is performed on the time duration of object presence and the adjacent time duration of object absence.

As the method of the present invention is directed toward counting sheets of paper by determining whether a light beam interruption was caused by a sheet of paper, the computer need only record and analyze the most recent light beam interruption and its interval as compared with the last preceding period of non-interruption, which was also stored. Once the computer has decided whether or not this interruption has been caused by the passage of a sheet of paper, there is no further need to store this timing data and no need to store data with regard to any previously occurring events. By analyzing only these most recent conditions, the method of the present invention operates reliably at different or varying conveyor speeds.

A method and system are therefore provided to measure the duration of the most recent interruption and compare this to the duration of the immediately preceding period of uninterrupted light beam passage. This method overcomes the conveyor speed-dependent problems inherent in methods of the prior art, which only sought to measure the duration of an interruption and then compare this value to a reference standard which determined whether the interruption was of sufficient time duration to have been caused by a sheet of paper.

Thus, the method of the present invention compares the duration of sequential time periods, rather than comparing any particular time period against some reference standard. In making this comparison, the duration of light beam interruption may be multiplied by a preset factor, with the result compared with the duration of the immediately preceding period of uninterrupted light beam passage. Mathematical manipulations can be made in several different ways. As an example, if the duration of the beam interrupt period when multiplied by a preset factor is longer than the duration of the immediately preceding uninterrupted period of light beam passage, this can be used to signify the passage of a sheet of paper.

The proper selection of the preset factor is important, since it is this value which enables the mathematical comparison to distinguish light beam interruptions caused by the passage of sheets of paper from other interruptions. As explained above, light beam interruptions may be caused by the passage of (1) a gripper bar alone, (2) a sheet of paper alone, (3) a gripper bar and trailing gripper clip together, or (4) a gripper bar, trailing gripper clip and sheet of paper together. Therefore, for any constant conveyor speed, four durations of light beam interruption can occur. The basic system of the invention analyzes whether the duration of a period of light beam interruption is of sufficient size to represent the passage of a sheet of paper when compared with the duration of the period of unblocked light. When determining whether an interruption's duration is sufficiently large as compared to the immediately preceding gap between this interruption and the preceding interruption, allowance must be made for missed sheets (increasing the gap times) and interfering clips (increasing the interrupt times slightly when a sheet is missing at that location and substantially when a sheet is not missing at that location).

This determination of interrupt size preferably is made only with comparison to the immediately preceding gap between interruptions, and a preset factor is applied to allow for possible interruptions to the beam caused by the gripper clips. In the present invention, a preset factor of two or more preferably is applied by the microcomputer in performing the mathematical comparison. This selection of a preset factor first ensures that an "empty" gripper bar with a trailing clip positioned in the path of the light beam (which is not pulling a sheet of paper itself), immediately following another gripper bar and clip pulling another sheet of paper on the conveyor, is not accidentally sensed as being "large enough" to be counted as a sheet of paper. In a second scenario, the proper selection of the preset factor ensures that an empty gripper bar with a trailing clip positioned in the path of the light beam (which is not pulling a sheet of paper itself), following an "empty" gripper bar and clip which are also not pulling a sheet of paper, is also not sensed as being "large enough" to be accidentally counted as a sheet of paper. This problem is particularly acute in this second case due to the rather long light break or interrupt period (caused by the gripper bar and clip acting together causing one continuous interruption) as compared to the smaller preceding gap or non-interrupt between the trailing edge of the last sheet of paper and the leading edge of the gripper bar.

In selecting this preset factor, it is also important to consider the physical distance separating the gripper bars on the conveyor and the physical size of the sheets of paper themselves. The preset factor must be set higher when the gripper bars are farther apart (for a given sheet length), and it must be set higher when the paper length is decreased (for a given gripper bar spacing). Taking these considerations into account in selecting the preset factor ensures that the mathematical comparison applied by the microcomputer does not inadvertently and accidentally judge that a gap preceding a gripper bar interruption was so short in relation to the actual interruption caused by the gripper bar (and also potentially the gripper clip), that the computer incorrectly infers that the gripper bar is product to be counted.

Lastly, one final consideration in selecting this preset factor is dealing with varying speed changes to the conveyor in real time. Such changes slightly alter the relationship between any light beam interruption and the gap that immediately preceded it. An accelerating conveyor will produce a correspondingly shorter light beam interruption when compared to the gap that preceded it, and conversely, a decelerating conveyor will produce a correspondingly longer light beam interruption when compared to the gap that immediately preceded it. As such, the preset factor must be selected with regard to the particular conveyor's potential speed changes such that a relatively longer light beam interruption is not inaccurately judged to be a sheet of paper when it is in fact a gripper bar (with or without a gripper clip trailing across the path of the light beam).

As can be seen, the proper selection of a preset factor used in the mathematical comparison will address all cases and will ensure that' sheets of paper are counted only when they in fact pass through the light beam, whether or not the gripper clips also pass through the light beam, whether or not the preceding gripper bar and clip was pulling a sheet of paper and regardless of the speed or speed change in the conveyor.

These and other objects, advantages and features of the invention will be apparent from the following description of a preferred embodiment, considered along with the accompanying drawings.

DESCRIPTION OF PREFERRED EMBODIMENTS

The invention is described in the context of a preferred embodiment in which moving objects or workpieces to be counted comprise sheets of paper, and in which a sensor comprises an optical, light-break device.

Figure 1:
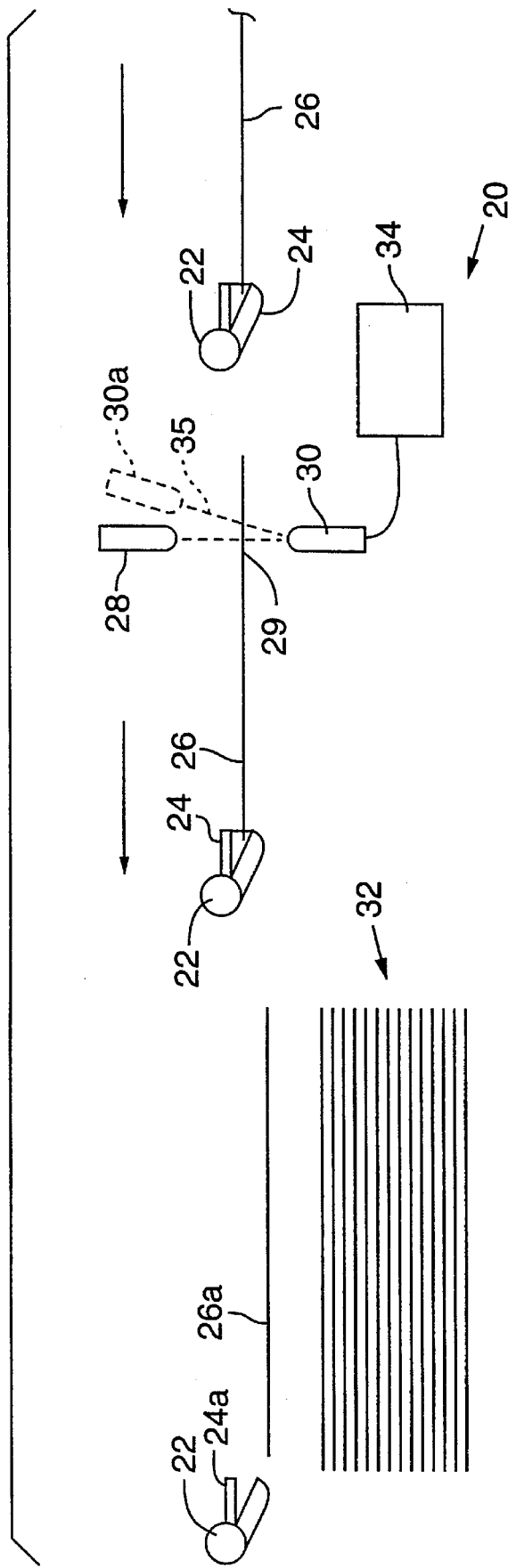
FIG. 1 is a schematic side view of a conveyor system with gripper bars with attached gripper clips pulling sheets of paper through the path of a light beam sent from a light source to a light receiver.

In the drawings, FIG. 1 shows in side schematic view a conveyor system 20 composed of gripper bars 22, with attached gripper clips 24 which grab and pull sheets of paper 26 along the conveyor 20 in the indicated direction of travel. A light source 28 positioned above the conveyor directs a beam of light 29 toward a light receiver 30 positioned below the conveyor. Alternatively, as shown in dashed lines, a 90° polarized receiver 30a may be used in lieu of the direct receiver 30, to sense a reflected light beam 35. The light beam 29 is interrupted in its travel to the sensor 30 by the passage of gripper bars 22, which have attached gripper clips 24 pulling sheets of paper 26 along the conveyor 20. A microcomputer 34 measures the duration of these interruptions to the light beam as well as measuring or calculating periods of non-interrupt (gaps), and applies a mathematical comparison to determine on what occasions the interruption is caused by the passage of a sheet of paper, thus accurately counting these sheets of paper.

Although the light beam type optical sensor shown and referred to herein is convenient, simple and quite common as a sensor on different types of production lines, the optical sensor is only illustrative. The system of the invention could be incorporated in a production line having one or more ultrasonic sensors, which send a frequency and receive back an echo indicating the presence of a conveyed product. The sensor could also be a capacitive type sensor, which measures the presence of items moving between two points, one on either side of the items. Another example of a sensor is a piezoelectric sensor, operating on pressure or touch, which can advantageously be employed in some cases. The invention will be described with reference to an optical sensor which passes a light beam through the path of the moving products. Those products are illustrated as sheets of paper, relative to a preferred embodiment, but this again is illustrative, and the products counted can be any of many different items.

After a conveyed sheet 26 has been pulled through the light beam 29 passing between the light source 28 and the light receiver 30, and after the sheet of paper (shown here as 26a) has reached the end of the conveyed path, gripper clips 24a open, allowing the released sheet 26a to fall onto a pile of finished sheets 32.

Figure 2:
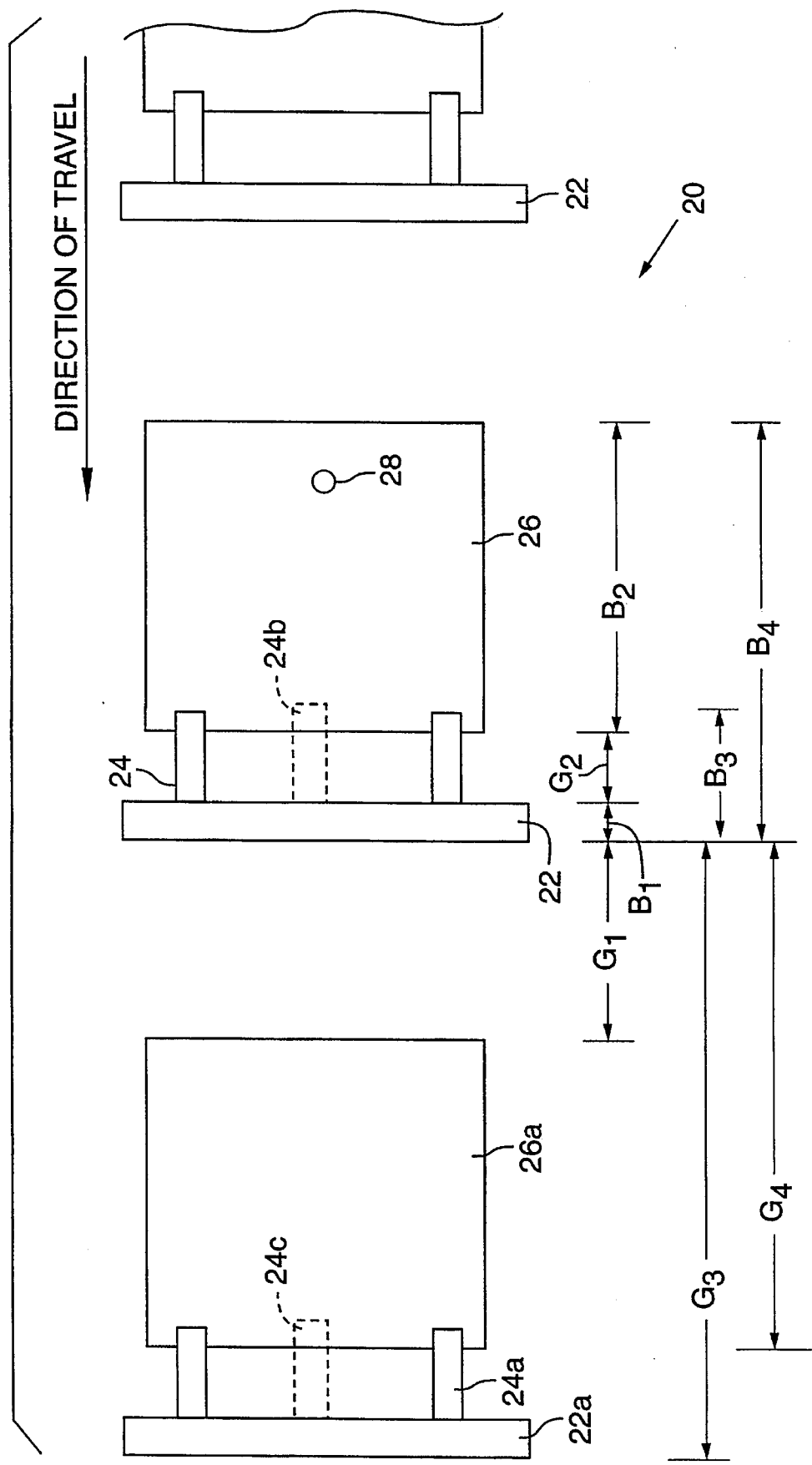
FIG. 2 shows schematically a plan view of the conveyor system with gripper bars and attached gripper clips pulling sheets of paper through the path of the light beam showing example dimensions of the gripper bars, gripper clips and sheets of paper and example spacings between gripper bars and their preceding and trailing sheets of paper. Symbols for gaps and light breaks are indicated at the bottom of the figure.

FIG. 2 shows in top view the conveyor system 20 with gripper bars 22 and gripper clips 24 pulling sheets of paper 26 in the indicated direction of travel along the conveyor and through the path of the light beam as sent directly downward from the light source 28 to the light receiver 30 (not seen in FIG. 2).

Distance $B_1$ in FIG. 2 is representative of the period of time during which the light beam is interrupted by the passage of a gripper bar 22. Similarly, distance $B_2$ represents the period during which the light beam is interrupted by the passage of a sheet of paper 26. Distance $G_1$ represents the "gap" period of time during which the light beam passes uninterrupted, between the passage of the trailing edge of the forward sheet 26a and the front edge of gripper bar 22. Distance $G_2$ represents the "gap" period during which the light beam passes uninterrupted between the passage of the trailing edge of the gripper bar 22 and the leading edge of the sheet of paper 26.

During a typical operation, the system's microcomputer 34 (as indicated in FIG. 1) will compare the duration of a light beam interruption (also known as a "light break") $B_1$ to the preceding "gap" interruption $G_1$ or similarly the light break at $B_2$ to the preceding gap $G_2$. However, if sheet 26a had been missing, the "gap", instead of $G_1$, would be the distance $G_3$, being the distance between the trailing edge of the preceding gripper bar 22a and the leading edge of gripper bar 22. Consequently, the microcomputer 34 in this case will compare the ratio between the light break $B_1$ and the gap $G_3$ which is the immediately preceding gap.

One further complication exists. Occasionally a gripper clip 24 may be positioned directly in the light beam path 29. This position is shown by a gripper clip at location 24b in FIG. 2. Whenever this occurs, the break in the light beam will be represented by distance $B_4$ if the sheet of paper 26 is present (i.e., the gripper bar, gripper clip and sheet of paper together cause one long-duration continuous interruption to the path of the light beam), or by the distance $B_3$ if the sheet of paper 26 is missing. Similarly, in the case where the previous sheet 26a was missing and the previous gripper clip was positioned so as to interfere with the passage of the light beam (shown here as position 24c), the distance $G_4$ will represent the gap between the trailing edge of gripper clip 24c and the leading edge of gripper bar 22.

The microcomputer 34 (as shown in FIG. 1) measures and compares light breaks and gaps and applies a straightforward algorithm to determine the presence of a sheet of paper. The microcounter preferably measures the duration of a particular light break (i.e. $B_1$, $B_2$, $B_3$ or $B_4$) and compares it to its immediately preceding gap ($G_1$, $G_2$, $G_3$ or $G_4$). An appropriate mathematical comparison is made such that only breaks $B_2$ and $B_4$ are sensed as indicating the passage of sheets of paper. More specifically, in one preferred embodiment the $B_x$ distance is multiplied by a preset factor (typically 2 or greater) and the result compared to the immediately preceding $G_x$. If and only if $G_x$ is smaller, the microcomputer 34 counts the light break as indicating the passage of a sheet of paper. Thus, in this example, if $G_1 > 2 \times B_1$, this indicates no sheet present; if $G_1 \leq 2 \times B_1$, this indicates a sheet was present.

Figure 3:
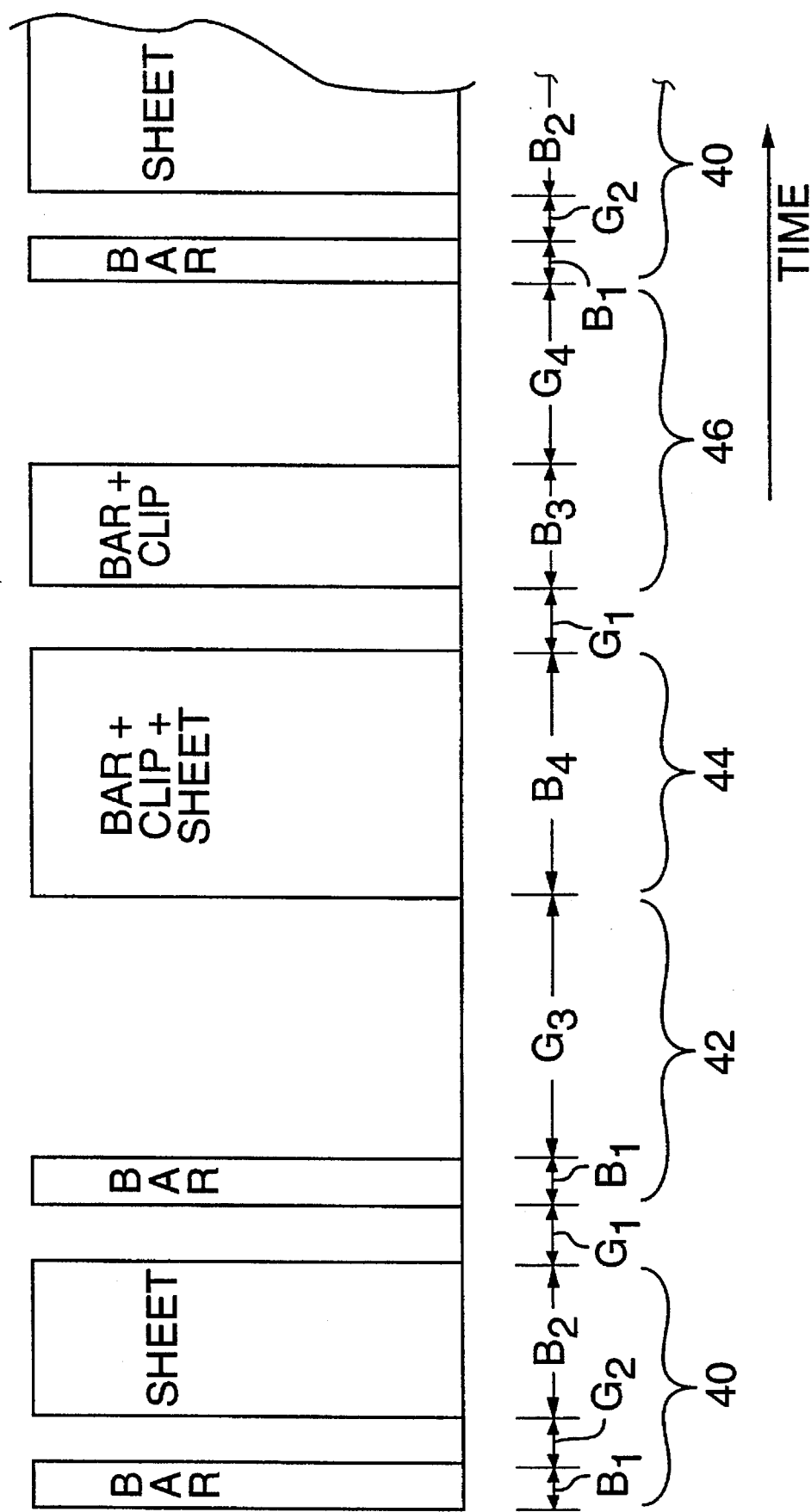
FIG. 3 is a graphic representation showing a step function generated by the light breaks, with time plotted against light beam interruption so that a sequence of passage of the gripper bars, gripper clips and sheets of paper is represented.

FIG. 3 is a step function graphic representation of various interruptions to the path of the light beam caused by the passage of gripper bars, gripper clips and sheets of paper. Combination 40 represents the most common situation, the passage of a gripper bar with gripper clips pulling a sheet of paper such that the positioning of the gripper clips does not interfere with the passage of the light beam. As such, $B_1$ represents the short break in the light beam caused by the passage of the gripper bar. $G_2$ represents the resumption of the path of the light beam during the physical gap between the gripper bar and the sheet of paper. This is followed by the longer break $B_2$ in the light beam caused by the passage of the sheet of paper. Following this, there is a brief gap $G_1$ between the trailing edge of the sheet of paper and the leading edge of the next subsequent gripper bar (this gap $G_1$ also occurs subsequent to combination 44 described herein).

Combination 42 represents the passage of an "empty" gripper bar which is not pulling a sheet of paper and which has its gripper clips positioned so as to not interfere with the passage of the beam of light. $B_1$ again represents the short break in the light beam caused by the passage of the gripper bar. This is then followed by the resumption of the light beam during the large physical gap $G_3$ between the passage of this "empty" gripper bar and the subsequent following gripper bar.

Combination 44 represents the passage of a gripper bar and clips pulling a sheet of paper with one gripper clip positioned so as to interfere with the passage of the light beam (the gripper clip position shown as locations 24b and 24c in FIG. 2). Thus, one long duration continuous light break $B_4$ is caused by the passage of the gripper bar, gripper clip and sheet of paper all passing through the light beam together.

The last possible combination 46 represents the passage of an "empty" gripper bar which is not pulling a sheet of paper and which has one of its gripper clips positioned so as to interfere with the passage of the light beam (the gripper clip position shown at 24b and 24c in FIG. 2). $B_3$ represents a light break of longer duration than $B_1$ due to the added interference of the gripper clip trailing across the path of the beam. For this same reason, gap $G_4$ will be correspondingly shorter than gap $G_3$.

It is to be understood that the four possible combinations 40, 42, 44 and 46 can and do occur in any random order, so that the ratio comparison performed by the computer between any $B_x$ and its immediately preceding $G_x$ must account for these possibilities when distinguishing only breaks $B_2$ or $B_4$ as representing the passage of sheets of paper.

It is a further property of a conveyor with all gripper bars spaced an equal distance apart that:

$$B_1+G_2+B_2+G_1=B_1+G_3=B_4+G_1=B_3+G_4.$$

Figure 4:
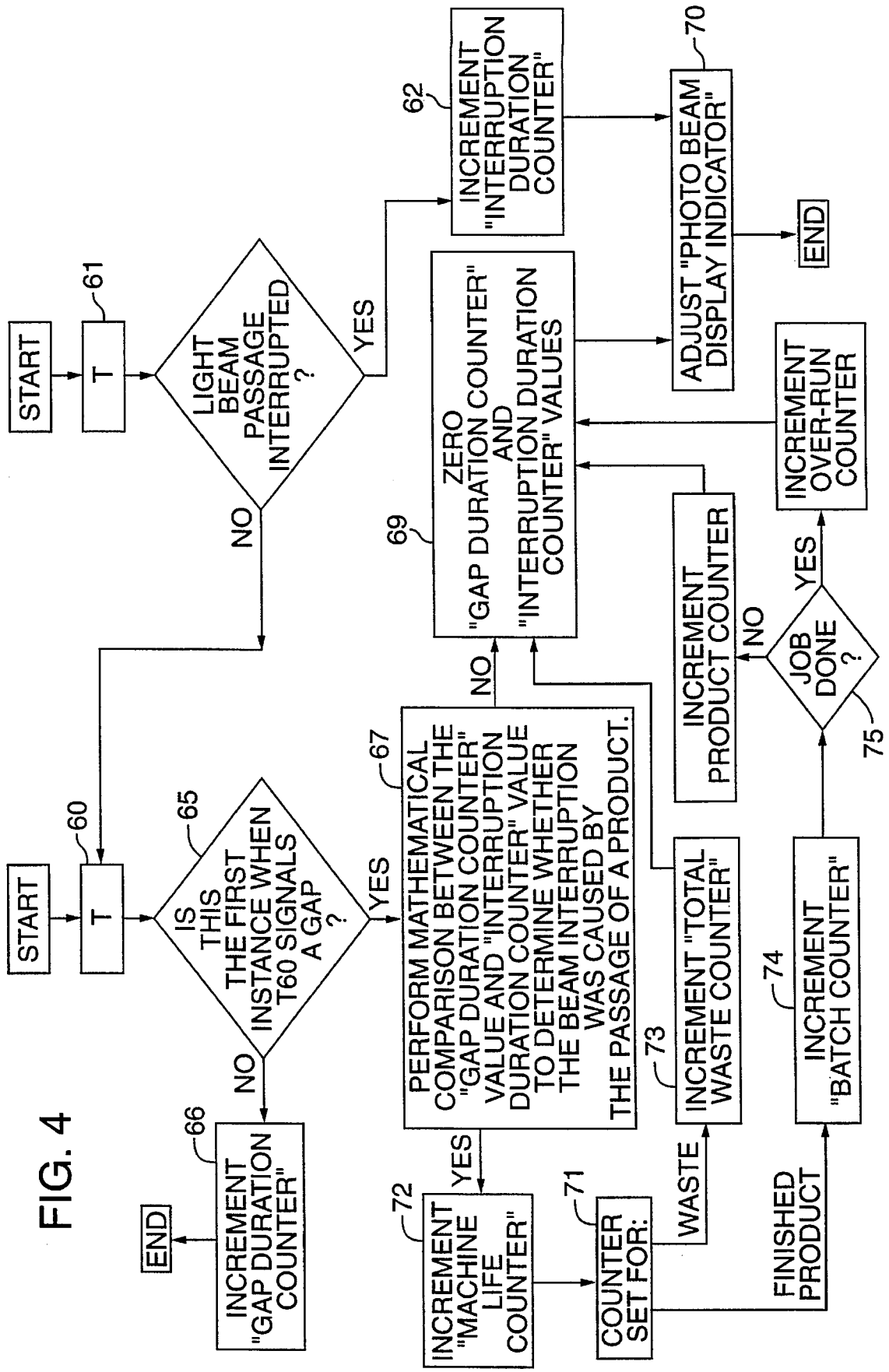
FIG. 4 is a schematic flow chart representation of a portion of the logic applied in carrying out the system of the invention.

FIG. 4 shows a portion of the process of the invention in flow chart form. The system employs two timers which measure time passage in 1 ms intervals. Timer 61 measures the duration of interruptions to the light beam path. Timer 60 measures the duration of periods of uninterrupted beam passage. During an interruption to the light beam passage, timer 61 adds 1 ms increments to the interruption duration counter 62 thus storing in said interruption duration counter a value equal to the duration of the light beam interruption.

During the period of uninterrupted beam passage, an initial check is made (by the microcomputer at step 65) to determine whether this is the first instance of uninterrupted beam passage immediately following the passage of a product on the conveyor as signalled by timer 60 as the start of a "gap" period between light beam interruptions. (In other words, timer 60 did not signal a "gap" reading 1 ms immediately before reading the present "gap".) If timer 60 had instead sent an immediately prior "gap" reading, timer 60 would then add a 1 ms increment to the gap duration counter 66, thus storing a value equal to the duration of the uninterrupted period of light beam passage. However, if it was determined (at step 65) that timer 60 had not immediately before sent a prior "gap" reading, and therefore that this is the first gap signal sent by timer 60, then the preset mathematical relation is applied at step 67 comparing the duration of the last light break period to the duration of the last uninterrupted beam passage period.

If it is determined (at step 67) that the interruption to the light bean was not caused by the passage of a product, then the gap duration counter and interruption duration counter values are both reset to zero at step 69 and the photo beam display indicator used for sensor operation diagnosis is adjusted (at step 70). However, if (at step 67) the beam interruption was determined to be due to the passage of a product, the machine life counter 72 is incremented (thus tallying the total product passing through the conveyor system). Next, a determination is made (at step 71), to determine whether the product is "finished product" or "waste". If it is waste, the total waste counter 73 is incremented. However, if the product is "finished product", the batch counter 74 is incremented. After the batch counter is incremented, an evaluation is done as to whether the job is completed (step 75). If so, the "extra overrun" counter is incremented; if not, the product counter is incremented. If required, such action is taken.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A method for accurately counting conveyed workpieces on a conveyor system which has a series of gripper bars, each of which is connected to a plurality of gripper clips which grip and pull a conveyed workpiece, with the gripper bars physically separated from the conveyed workpiece by the intervening gripper clips, and for discriminating between conveyed workpieces and gripper bars, whereby workpieces are accurately counted regardless of variations in conveyor speed, comprising:

using a conveyed object sensor adjacent to which conveyed workpieces and gripper bars pass to detect the presence and movement of gripped workpieces and gripper bars passing a selected point by detecting intervals of object presence and object absence at the selected point, providing a computer and an associated computer memory;

measuring and storing in the computer memory the time duration of intervals of object presence and the time duration of intervals of object absence at the selected point, with the computer, performing a mathematical comparison step to decide whether each interval of object presence represents the passage of a conveyed workpiece by mathematically comparing the time duration of the interval of object presence with the time duration of an immediately adjacent interval of object absence using a preselected mathematical comparison algorithm, and if and only if the mathematical comparison determines that an interval of object presence has been caused by the passage of a workpiece, counting that interval as a workpiece.

2. The method of claim 1, wherein the mathematical comparison applied by the computer evaluates whether the duration of the most recent interval of object presence when multiplied by a preset factor is longer than that period of time of the immediately preceding interval of object absence, thus determining that the object presence was due to the passage of a workpiece, and therefore counting the most recent interval of object presence as a workpiece.

3. The method of claim 2, wherein the preset factor is set equal to or greater than 2.

4. The method of claim 1, wherein the conveyed workpieces are sheets of paper.

5. The method of claim 2, wherein the mathematical comparison between the duration of intervals of object presence and their immediately preceding intervals of object absence is applied such that the computer is able to determine that an interval of object presence has been due to the passage of a gripper bar which is not to be counted as a conveyed workpiece.

6. The method of claim 2, wherein the preset factor used in the mathematical comparison as applied by the computer is selected so as to allow for accurate counting of conveyed workpieces when a gripper clip also passes adjacent to the selected point such that the passage of the gripper bar, gripper clip and conveyed workpiece causes a single continuous interval of object presence.

7. The method of claim 2, wherein the preset factor used in the mathematical comparison as applied by the computer is selected so as to ensure that the passage of a conveyed workpiece is accurately counted whether or not such workpiece has been immediately preceded on the conveyor by a gripper bar with gripper clips pulling another workpiece, and further to ensure that the passage of a gripper bar with gripper clips that is not pulling a conveyed workpiece is not accidentally counted as a conveyed workpiece whether or not such gripper bar has been immediately preceded on the conveyor by the passage of another workpiece.

8. The method of claim 2, wherein the conveyed object sensor comprises an optical sensor with a light source and a light receiver between which a light beam passes, the light beam being broken by passage of an object at said selected point, defining light breaks as said intervals of object presence.

9. The method of claim 1, wherein the conveyed object sensor comprises an optical sensor with a light source and a light receiver between which a light beam passes, the light beam being broken by passage of an object at said selected point, defining light breaks as said intervals of object presence.

10. A method for accurately counting conveyed workpieces on a conveyor system wherein moving elements other than the workpieces travel along essentially the same path as the workpieces, and for discriminating between conveyed workpieces and such other moving elements, whereby workpieces are accurately counted regardless of variations in conveyor speed, comprising:

using a conveyed object sensor adjacent to which conveyed workpieces and other moving elements pass to detect the presence and movement of workpieces and other moving elements passing a selected point by detecting intervals of object presence and object absence at the selected point, providing a computer and an associated computer memory;.

measuring and storing in the computer memory the time duration of intervals of object presence and the time duration of intervals of object absence at the selected point, with the computer, performing a mathematical comparison step to decide whether each interval of object presence represents the passage of a conveyed workpiece by mathematically comparing the time duration of the interval of object presence with the time duration of an immediately adjacent interval of object absence using a preselected mathematical comparison algorithm, and if and only if the mathematical comparison determines that an interval of object presence has been caused by the passage of a workpiece, counting that interval as a workpiece.

11. The method of claim 10, wherein the mathematical comparison applied by the computer evaluates whether the duration of the most recent interval of object presence when multiplied by a preset factor is longer than that period of time of the immediately preceding interval of object absence, thus determining that the object presence was due to the passage of a workpiece, and therefore counting the most recent interval of object presence as a workpiece.

12. The method of claim 11, wherein the preset factor is set equal to or greater than 2.

13. The method of claim 10, wherein the conveyed workpieces are sheets of paper.

14. The method of claim 10, wherein the conveyed object sensor comprises an optical sensor with a light source and a light receiver between which a light beam passes, the light beam being broken by passage of an object at said selected point, defining light breaks as said intervals of object presence.

* * * * *